United States Patent
Anderson (10) Patent No.: US 9,443,307 B2
(45) Date of Patent: Sep. 13, 2016

(54) PROCESSING OF IMAGES OF A SUBJECT INDIVIDUAL

(71) Applicant: INTEL CORPORATION, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,945

(22) PCT Filed: Sep. 13, 2013

(86) PCT No.: PCT/US2013/059706
§ 371 (c)(1),
(2) Date: Dec. 19, 2013

(87) PCT Pub. No.: WO2015/038144
PCT Pub. Date: Mar. 19, 2015

(65) Prior Publication Data
US 2015/0078628 A1    Mar. 19, 2015

(51) Int. Cl.
G06K 9/00 (2006.01)
G06T 7/00 (2006.01)
G06T 11/60 (2006.01)
G06K 9/62 (2006.01)
G06T 11/00 (2006.01)

(52) U.S. Cl.
CPC ......... *G06T 7/0044* (2013.01); *G06K 9/00228* (2013.01); *G06K 9/00288* (2013.01); *G06K 9/00308* (2013.01); *G06K 9/6215* (2013.01); *G06T 7/004* (2013.01); *G06T 11/00* (2013.01); *G06T 11/60* (2013.01); *G06T 2200/24* (2013.01); *G06T 2200/32* (2013.01); *G06T 2207/10004* (2013.01); *G06T 2207/10016* (2013.01); *G06T 2207/20221* (2013.01); *G06T 2207/30201* (2013.01)

(58) Field of Classification Search
None
See application file for complete search history.

(56) References Cited

U.S. PATENT DOCUMENTS

| 5,912,980 | A | 6/1999 | Hunke |
| 7,570,281 | B1 | 8/2009 | Ono |
| 7,768,528 | B1* | 8/2010 | Edwards ................. G06T 13/80 345/473 |
| 2005/0225566 | A1* | 10/2005 | Kojo ....................... G06T 13/80 345/629 |

(Continued)

FOREIGN PATENT DOCUMENTS

WO    WO 2007-035558 A2    3/2007

OTHER PUBLICATIONS

Shah, Rajvi, and Vivek Kwatra. "All smiles: automatic photo enhancement by facial expression analysis." Proceedings of the 9th European conference on visual media production. ACM, 2012. 10 pages.*

(Continued)

*Primary Examiner* — Sumati Lefkowitz
*Assistant Examiner* — Ryan P Potts
(74) *Attorney, Agent, or Firm* — Schwabe, Williamson & Wyatt, P.C.

(57) ABSTRACT

A computing system receives a plurality of candidate images of a subject individual and generates pose data for each of the candidate images. The pose data of a candidate image is representative of a pose of the subject individual in that image. The computing system selects an image from the candidate images by generating a similarity value for each of the candidate images by comparing the pose data to target pose data.

12 Claims, 6 Drawing Sheets

(56) References Cited

U.S. PATENT DOCUMENTS

| | | | |
|---|---|---|---|
| 2007/0077025 A1 | 4/2007 | Mino | |
| 2008/0019576 A1* | 1/2008 | Senftner | G06T 7/2046 382/118 |
| 2008/0037841 A1* | 2/2008 | Ogawa | H04N 5/232 382/118 |
| 2014/0153832 A1* | 6/2014 | Kwatra et al. | 382/195 |
| 2014/0369627 A1* | 12/2014 | Huang | G06T 5/50 382/309 |

OTHER PUBLICATIONS

U.S. Appl. No. 61/835,726, filed Jun. 17, 2013, which corresponds to US 2014/0369627 A1. 7 pages.*

International Search Report and Written Opinion mailed Jun. 16, 2014 for International Application No. PCT/US2013/059706, 11 pages.

Microsoft shows off Windows Live Photo Gallery's Photo Fuse compositing, http://downloadsquad.switched.com/2011/01/11/microsoft-shows-off-windows-live-photo-gallerys-photo-fuse-compositing.

This $0.99 iPhone App Magically Combines Group Photos, http://thenextweb.com/apps/2012/01/16/this-0-99-iphone-app-magically-combines-group-photos-to-give-you-the-perfect-shot.

International Preliminary Report on Patentability mailed Mar. 24, 2016 for International Application No. PCT/US2013/059706, 7 pages.

* cited by examiner

| | 302 | 304 | 306 | 308 | 310 | 312 | 314 |
|---|---|---|---|---|---|---|---|
| | IMAGE | SUBJECT | MOUTH | HEAD-NECK ORIENTATION | TEETH | HAIR PART | EYE SHAPE |
| 316 | Vid147_Frame2 | {Doris, Ryan} | {smile, frown} | {30deg, 5deg} | {shown, hidden} | {left, right} | {open, partial} |
| 318 | Vid147_Frame17 | Doris | pursed | -15deg | shown | left | closed |
| 320 | Img33 | Jack | open | -7deg | hidden | none | wide |

PROCESSING OF IMAGES OF A SUBJECT INDIVIDUAL

CROSS REFERENCE TO RELATED APPLICATION

The present application is a national phase entry under 35 U.S.C. §371 of International Application No. PCT/US2013/059706, filed Sep. 13, 2013, entitled "PROCESSING OF IMAGES OF A SUBJECT INDIVIDUAL," which designated, among the various States, the United States of America, and which is hereby incorporated by reference.

TECHNICAL FIELD

The present disclosure relates generally to the field of data processing, and more particularly, to the processing of images of a subject individual.

BACKGROUND

There are a number of software tools available for aiding a user in piecing together an "improved" image from multiple images. Some such tools may process a collection of images taken at the same sitting (e.g., multiple shots of a family posed for a portrait) and combine pieces of each to create a final image in which everyone is looking the same way, has their eyes open, is smiling, etc. Typically, these tools require the user of the tool to manually indicate which portion of a base image they'd like to edit, in response to which the tool may supply the user with candidate replacement portions from the collection. Once the user selects the desired replacement, the tool may stitch the replacement portion back into the base image. Typically, a user must manually review all candidate replacement portions in order to find the desired replacement, a process which may be prohibitively time intensive (particularly when the images include tens or hundreds of frames from a video shoot). Tools that automatically select a replacement, without user input, use their own set of criteria for selecting the replacement that may be unrelated or antithetical to the user's desired replacement.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of techniques, apparatuses, systems and computer-readable media for processing images of a subject individual are disclosed. In some embodiments, a computing system may receive the plurality of candidate images of the subject individual, and may generate pose data for each of the candidate images. The pose data of a candidate image may be representative of a pose of the subject individual in that image. The computing system may compare the pose data to target pose data to generate a similarity value for each of the candidate images for selecting an image from the candidate images.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments.

Furthermore, the terms "comprising," "including," "having," and the like, as used with respect to embodiments of the present disclosure, are synonymous. As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
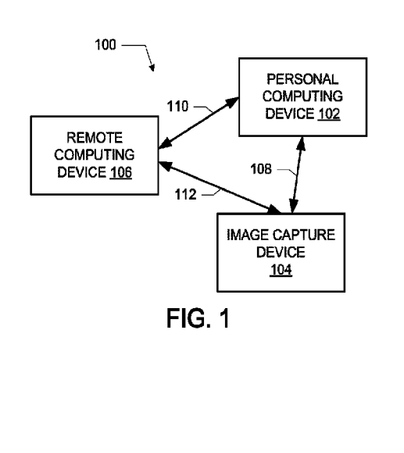
FIG. 1 is a block diagram of an illustrative computing system configured for processing images of a subject individual, in accordance with various embodiments.

FIG. 1 depicts an illustrative computing system 100 configured for processing images of a subject individual, in accordance with various embodiments. In some embodiments, the computing system 100 may be configured to receive a plurality of candidate images of the subject individual, generate pose data for each of the candidate images, and compare the pose data to target pose data to generate a similarity value for each of the candidate images for selecting an image from the candidate images. Image processing and other operations may be distributed between various components of the computing system 100 as suitable. Several examples of the distribution of operations between the components of the computing system 100 are discussed herein, but any other combination of more or less components and distribution of the operations may be used. In some embodiments, the computing system 100 may be configured as the image processing system 200, discussed below with reference to FIG. 2.

The computing system 100 may include a personal computing device 102, an image capture device 104, and a remote computing device 106. Communication between the components of the computing system 100 may be enabled by the communication pathways 108, 110 and 112. The communication pathways 108, 110 and 112 may each include wired communication pathways and/or wireless communication pathways, over direct couplings, and/or over personal, local and/or wide area networks. Each of the personal computing device 102, the image capture device 104 and the remote computing device 106 may include suitable hardware for supporting the communication pathways 108, 110 and 112, such as network interface cards, modems, WiFi devices, Bluetooth devices, and so forth. In some embodiments, the communication pathways 108, 110 and 112 may be direct communication pathways between the components as illustrated in FIG. 1. As used herein, references to "direct" communication pathways between two components of the computing system 100 of FIG. 1 (or any system or device disclosed herein) may refer to a communication pathway that does not route through another illustrated component, but that may route through other non-illustrated devices (e.g., routers and/or switches).

Each of the devices included in the computing system 100 may include a processing device and a storage device (not shown). The processing device may include one or more processing devices, such as one or more processing cores, ASICs, electronic circuits, processors (shared, dedicated, or group), combinational logic circuits, and/or other suitable components that may be configured to process electronic data. The storage device may include any suitable memory or mass storage devices (such as solid-state drive, diskette, hard drive, compact disc read only memory (CD-ROM) and so forth). Each of the computing devices included in the computing system 100 may include one or more buses (and bus bridges, if suitable) to communicatively couple the processing device, the storage device, and any other devices included in the respective computing devices. The storage device may include a set of computational logic, which may include one or more copies of computer readable media having instructions stored therein which, when executed by the processing device of the computing device, may cause the computing device to implement any of the techniques and methods disclosed herein, or any portion thereof. In some embodiments, the computational logic may include any of the logic discussed below with reference to FIG. 2.

The personal computing device 102 may be a computing device that is integrated into a garment, accessory or other support structure that is configured to be worn on the body of the user (or "wearer"). Examples of suitable support structures for a wearable personal computing device 102 may include glasses, a headset, a hair accessory (e.g., a headband or barrette), an ear piece, jewelry (e.g., brooch, earrings or a necklace), a wrist band (e.g., a wristwatch), a neck band (e.g., a tie or scarf), a garment (e.g., a shirt, pants, dress skirt or jacket), shoes, a lanyard or nametag, a contact lens, or an implantable support structure, among others. In some embodiments, the personal computing device 102 may be a wrist-mounted computing device having a camera and microphone. In some embodiments, the personal computing device 102 may be a glasses-mounted computing device having a camera (which may serve as the image capture device 104) and microphone. In some embodiments, the personal computing device 102 may include a "world-facing" camera (i.e., a camera directed away from the wearer, serving as the image capture device 104) and a microphone.

The personal computing device 102 may be a desktop or stand-alone computing device, or a computing device configured for carrying in a pocket, backpack or other carrying case, and for operation with one or more of a user's hands. Examples of computing devices that may serve as the personal computing device 102 include cellular phones, smartphones, other handheld mobile communication devices, tablets, electronic book readers, personal digital assistants, laptops, or other such computing devices. Although the personal computing device 102 (and other components described herein) may be referred to in the singular, any number of personal computing devices may be included in the personal computing device 102 (and similarly, any component may include multiple such components).

Image processing and other operations performed by the personal computing device 102 may be controlled by an app or plug-in on the personal computing device 102, for example. In some embodiments, the personal computing device 102 may include two or more computing devices, one of which has more computing resources (e.g., processing power, memory, and/or communication bandwidth) than another. For example, the personal computing device 102 may include a larger tablet computing device and a smaller wrist- or glasses-mounted computing device. In such embodiments, data captured and preliminarily processed by the smaller computing device (e.g., image, audio, or other sensor data) may be transmitted from the smaller computing device to the larger computing device for further processing.

The computing system 100 may include an image capture device 104. In some embodiments, the image capture device 104 may include one or more cameras. As used herein, the term "camera" may include still image cameras and video cameras. A camera may be analog or digital. In some embodiments, the image capture device 104 may capture high-definition video. In some embodiments, the image capture device 104 may be configured to stream image data (e.g., video data) to the personal computing device 102 and/or the remote computing device 106 via a wired or wireless communication pathway (e.g., the pathways 108 and 112, respectively). In some embodiments, the image capture device 104 may be connected locally to (or integrated with) the personal computing device 102, while in other embodiments, the image capture device 104 may be remote from the personal computing device 102 (and, for example, may be integrated with a personal computing device associated with a different owner or user than the owner or user of the personal computing device 102).

The image capture device 104 may use any imaging wavelength (e.g., visible or infrared light). In some embodiments, the image capture device 104 may include a visible light camera and an infrared camera, and may combine the images captured by these devices or treat them separately. In some embodiments, the image capture device 104 may include two or more cameras having different orientations (e.g., one camera that is mounted on the personal computing device 102 and faces away from the user in a "world-facing" orientation, and one camera that is mounted on the personal computing device 102 and faces toward the user when the personal computing device 102 is in use). In some embodiments, the image capture device 104 may include a single image capture device (e.g., a single camera). In some embodiments, the image capture device 104 may be configured to capture a fixed number of still images sequentially, and may alert the user prior to capturing each image with a sound or other indicator.

The image capture device 104 may include multiple image capture devices, each associated with a different user of the computing system 100. For example, each user of a social networking service (running on the computing system 100) may have an image capture device (e.g., the image capture device 104) integrated into the user's smartphone or tablet (e.g., the personal computing device 102), and may provide captured images to the remote computing device 106 for processing, as discussed below. In another example, the image capture device 104 may include an array camera, in which multiple lenses enable simultaneous capture of multiple images of the same subject. Each image captured by an array camera may vary by exposure time, focal distance, white balance, etc. The image capture device 104 may include a processing device which is configured to execute any known technique for combining the images or provide various image browsing experiences (e.g., in conjunction with other components of the computing system 100).

The remote computing device 106 may include one or more servers (e.g., arranged in a "cloud" computing configuration) or other computing devices remote from the personal computing device 102 and/or the image capture device 104. The communication pathway 110 between the personal computing device 102 and the remote computing device 106, and communication pathway 112 between the image capture device 104 and the remote computing device 106, may be configured according to any remote wired or wireless communication protocol. In some embodiments, the remote computing device 106 may have more computing resources (e.g., processing power, memory, and/or communication bandwidth) than the personal computing device 102 or the image capture device 104. Thus, in some embodiments, data captured and preliminarily processed by the personal computing device 102 and/or the image capture device 104 (e.g., image, audio, or other sensor data) may be transmitted over the communication pathways 110 and/or 112 to the remote computing device 106 for further processing. In some embodiments, the remote computing device 106 may perform most of the image processing operations discussed below with reference to FIG. 2, including those performed by the image input logic 204, the pose identification logic 208, the pose analysis logic 212, the selection logic 214, the image editing logic 220, the user authentication logic 222 and/or the recognition logic 224. In some embodiments, the remote computing device 106 may include a storage device for storing images and/or pose data that may be accessed when the computing system 100 performs an image processing operation in accordance with the techniques disclosed herein.

As indicated above, in some embodiments, the remote computing device 106 may communicate with a plurality of personal computing devices (configured similarly to the personal computing device 102) and/or a plurality of image capture devices (configured similarly to the image capture device 104). The remote computing device 106 may perform similar processing and storage operations for each personal computing device or image capture device. For example, the remote computing device 106 may receive images captured by a plurality of image capture devices (configured similarly to the image capture device 104) and may perform image processing on these images (e.g., generating pose data for subject individuals in the images). The remote computing device 106 may devote different resources to different ones of the plurality of personal computing devices or image capture devices in communication with the remote computing device 106 (e.g., different memory partitions or databases for each device).

In some embodiments of the image processing systems disclosed herein, one or more of the communication pathways between components of the computing system 100 may not be included. For example, in some embodiments, the image capture device 104 may not communicate directly with the remote computing device 106 via the communication pathway 112, but may communicate with the remote computing device 106 via the personal computing device 102 and the communication pathways 108 and 110.

Figure 2:
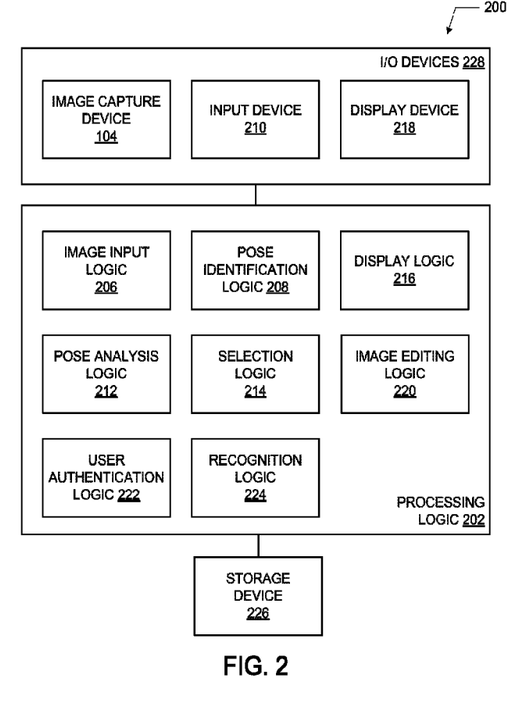
FIG. 2 is a block diagram of an illustrative image processing system that may be implemented by the computing system of FIG. 1, in accordance with various embodiments.

FIG. 2 is a block diagram of an illustrative image processing system 200 configured for processing images of a subject individual, in accordance with various embodiments. The image processing system 200 may include input/output (I/O) devices 228, processing logic 202, and a storage device 226. The image processing system 200 may be configured to perform any of a number of image processing operations. For example, the image processing system 200 may be configured to receive a plurality of candidate images of the subject individual, generate pose data for each of the candidate images, and compare the pose data to target pose data to generate a similarity value for each of the candidate images for selecting an image from the candidate images.

The image processing system 200 may be implemented by the computing system 100 of FIG. 1, in accordance with various embodiments. In particular, the components of the image processing system 200 may be distributed in any suitable manner among one or more of the components of the computing system 100. Although a number of components of the image processing system 200 are illustrated in FIG. 2, various embodiments may omit components as appropriate for the image processing operations to be performed. For example, some embodiments of the image processing system 200 may not be configured for authenticating a user, and thus may not include the user authentication logic 222 and/or the recognition logic 224.

The I/O devices 228 of the image processing system 200 may include the image capture device 104. The image capture device 104 may take any of the forms discussed above with reference to FIG. 1. For example, the image capture device 104 may be included in the personal computing device 102 (FIG. 1), which may stream image data wirelessly to the remote computing device 106 via the communication pathway 110.

The I/O devices 228 may further include an input device 210. As noted above, although the input device 210 may be referred to in the singular, the input device 210 may include multiple input devices, each operating according to one or more input modalities. The input device 210 may include an audio capture device. The audio capture device may include one or more microphones. In some embodiments, the audio capture device may include multiple microphones with different orientations, which may allow the image processing system 200 to locate various speakers and correlate those locations with subjects identified in an image captured by the image capture device 104. The input device 210 may be configured to receive a touch input, a voice input, or a gesture input, for example, and convert those inputs into electrical signals that may be communicated to other components of the processing system 200. The input device 210 may include a keyboard, a cursor control device such as a mouse, a stylus, a touchpad, a bar code reader, a Quick Response (QR) code reader, a radio frequency identification (RFID) reader, a Global Positioning System (GPS) receiver, a short-range wireless receiver (e.g., a BLUETOOTH receiver), one or more sensors (e.g., an accelerometer or a motion detector), or any other suitable input device.

The image processing system 200 may include a display device 218. As discussed above with reference to the input device 210, although the display device 218 may be referred to in the singular, any number of display devices may be included in the display device 218. In some embodiments, the display device 218 may include a single output device (e.g., a single display). The display device 218 may include one or more heads-up displays (i.e., displays including a projector arranged in an optical collimator configuration and a combiner to provide data without requiring a user to look away from his or her typical viewpoint), computer monitors, projectors, touchscreen displays, liquid crystal displays (LCDs), light-emitting diode displays or flat panel displays, for example. Although not illustrated in FIG. 2, the I/O devices 228 of the image processing system 200 may include other output devices, such as an audio output device (which may include one or more speakers or other audio transducers which may be, for example, mounted in one or more earphones or earbuds), and/or one or more printers, projectors, wired or wireless transmitters for providing information to other devices, additional storage devices, or any suitable output device.

The image processing system 200 may include a storage device 226. In some embodiments, the storage device 226 may include one or more databases or other data storage structures for storing any of the data described herein for access by any of the components of the image processing system 200. The storage device 226 may include any memory device, such as one or more hard drives, solid state logic, or portable storage media, for example. The storage device 226 may be local to any one or more of the components of the processing logic 202 and/or the I/O devices 228, or remote from any component. The storage device 226 may include both local and remote components. The storage device 226 may include a plurality of different storage devices, which may be of different storage types (e.g., a hard drive and a portable storage device, for example).

The I/O devices 228 and the storage device 226 may be coupled to the processing logic 202. The processing logic 202 may include an input device interface (not shown) configured to receive data from one or more of the I/O devices 228 and route this data to one or more of the components of the processing logic 202. In some embodiments, the image capture device 104 may be coupled with the image input logic 206 to enable the image input logic 206 to receive images from the image capture device 104. In some embodiments, the input device 210 may be coupled with the pose identification logic 208 to enable the pose identification logic 1208 to receive an input representative of a target pose. Although the components of the processing logic 202 are illustrated separately, the components may be combined or divided as suitable, and each may use one or more of the results generated by others in performing its own analysis. Data may be communicated between the components of the processing logic 202 over a physical bus, a long-distance wired communication pathway, a short- or long-distance wireless communication pathway, or any combination of communication pathways.

The processing logic 202 may include image input logic 206. In some embodiments, the image input logic 206 may be configured to receive a plurality of candidate images of a subject individual. These images may be received from the image capture device 104, or may be accessed from a memory (e.g., included in the storage device 226) or otherwise provided to the image input logic 206 (e.g., through a text message sent to the personal computing device 102, in which the image input logic 206 is disposed). If the candidate images are not already stored in an accessible location, the image input logic 206 may provide the images to the storage device 226 for storage in the storage device 226.

The candidate images received by the image input logic 206 may include a plurality of images that include a subject individual. The subject individual may be a user of the image processing system 200 or a different individual. For example, the user of the image processing system 200 may be a parent, and the candidate images may include a plurality of images of the user's daughter. The candidate images may include images of the subject individual taken at different times and/or under different conditions. The candidate images may include one or more frames of a video. In some embodiments, using multiple frames of a video of the subject individual as the candidate images may be a particularly efficient way to generate a large collection of candidate images.

In some embodiments, the image input logic 206 may process an initially received set of images to form the set of candidate images. The processing performed by the image input logic 206 may include comparing various ones of the initially received images to each other and only retaining a subset of the initially received images as the candidate images while eliminating the remainder from further consideration.

An initially received image may not be included among the candidate images because it is out of focus, the subject individual is too far away or not clearly visible, and/or because the image is too dark or light, for example. An initially received image also may not be included among the candidate images because it is too similar to an image included in the candidate images. In such embodiments, the image input logic 206 may use clustering or another dimension reduction algorithm to identify a subset of the initially received images that substantially represent the range of variety of the initially received images (and meet any other desired criteria), and use this subset as the candidate images for further processing. Using a subset of the initially received images as the candidate images may reduce the load on the image processing system 200 (e.g., measured in processing cycles, memory needs, etc.), and thus result in faster image processing. The image input logic 206 may be configured to perform this reduction based on the subject individual (e.g., by identifying candidate images in which the subject individual is in as many different poses as possible) or by considering the image as a whole (e.g., by identifying candidate images in which the whole images is sufficiently different from other candidate images). In embodiments in which the image input logic 206 identifies the subject individual, the image input logic 206 and the pose identification logic 208 (discussed below) may use similar techniques and/or hardware to identify the pose of the subject individual in the initially received images. In some embodiments, the image input logic 206 and the pose identification logic 208 may be embodied in common hardware.

The processing logic 202 may include pose identification logic 208. The pose identification logic 208 may be configured to generate pose data for each of the candidate images ("candidate pose data"). The candidate images, as described above, may be received by the image input logic 206 (e.g., from the image capture device 104). The image input logic 206 may provide the candidate images to the pose identification logic 208, or the pose identification logic 208 may access the images from the storage device 226. The pose identification logic 208 may perform its pose identification techniques on any particular image at any time (e.g., automatically and immediately after images are acquired or at the time target posedata is supplied to the computing system 100, for example). The pose data may be stored in the metadata of the associated image, which may allow for faster similarity analysis at a later time. A used herein, the term "pose data" may refer to data representative of a pose of a subject individual in an image. Pose data may take any of a number of forms. For example, pose data may provide discrete values for a discrete set of pose-related variables, such as the symmetry of an individual's eyes, the orientation of the individual's eyebrows, whether the individual's left ear is exposed, or any other variable. Alternatively or in addition to these discrete values for discrete variables, pose data may include a representation of the relative positions of various pose-related landmarks on the subject individual's body, and/or a contour map or other representation of the subject individual's pose in an image. In some embodiments, pose data may consist of a prioritized set of nominal and/or ordinal attributes. For example, a "smile" attribute could take the values "yes" or "no"; a "head tilt" attribute (determined, e.g., by examining the offset of eye height from a calculated horizon line) could take the values "high," "medium," or "low"; and a "head turn" attribute could take any value representative of an estimated degree of head turn (e.g., both left and right). Several video and image analysis techniques for determining the values of such attribute are known in the art and may be used by the pose identification logic 208 to generate pose data. Several examples of pose data are discussed herein (e.g., with reference to FIG. 3 below).

In some embodiments, the pose identification logic 208 may also generate pose data representative of a target pose ("target pose data"), which may be compared to the candidate pose data (generated by the pose identification logic 208, as discussed above) by the pose analysis logic 212 and/or the selection logic 214, as discussed below. In other embodiments, logic different from the pose identification logic 208 may generate pose data representative of a target pose, and provide this target pose data to the pose analysis logic 212. For ease of discussion, the bulk of this disclosure will discuss embodiments in which the pose identification logic 208 generates target pose data.

In some embodiments, the pose identification logic 208 may receive a target pose-related input, and generate the target pose data based on the target pose-related input. For example, in some embodiments, the input device 210 may be coupled to the pose identification logic 208, and the pose identification logic 208 may be configured to receive the target pose-related input from a user via the input device 210. In various embodiments, the input may be one of a touch input, a voice input, or a gesture input. For example, the target pose-related input may include a spoken word query received through an audio capture device included in the input device 210, or a text query received through a keyboard or touchpad included in the input device 210. The input may be a natural language input, a structured input (e.g., a Boolean input) and may be processed using known natural language processing or other data parsing techniques. In some embodiments, the input may be a sketch of a desired pose (drawn by the user, for example, using mouse or a tablet device and stylus). In some embodiments, the input may be a desired pose identified by allowing the user to graphically manipulate a displayed image of a model in the same manner that one manipulates a wooden artist's mannequin. The image processing system 200 may include logic configured to render a digital version of such a model and receive and respond to digital user manipulations of such a model. In some embodiments, the input may be digital signals representative of the positions of joints, facial features, and other articulable points of a physical model of a person (e.g., a body and/or a face) outfitted with sensors to track the position of these points.

In some embodiments, the target pose-related input may include a target pose image. The target pose image may depict a target individual positioned in a target pose. The pose identification logic 208 may be configured to generate target pose data (representative of the pose of the target individual in the target image) by analyzing the target pose image in the same way that the pose identification logic 208 generated the candidate pose data for each candidate image.

The target individual may be different from the subject individual. For example, in some embodiments, a user of the image processing system 200 may be a photographer or photo editor who is seeking an image, from a candidate set of images, in which a subject individual (different from the user) is in a particular pose. To identify the desired image, the user may position herself in the desired pose and use the image capture device 104 to capture an image of the user in the desired pose. That image may be then be provided to the processing logic 202 (e.g., via the image input logic 206) as a target pose image. The target pose image may then be processed by the pose identification logic 208 to generate target pose data representative of the pose of the user. As discussed below, the processing logic 202 may then compare the target pose data to the candidate pose data to generate similarity values and select the desired image (e.g., the image in which the user is posed most similarly to the pose depicted in the target pose image). The target individual need not be a living person. For example, in some embodiments, the target individual depicted in the target pose image may be a cartoon drawing, a photograph of an artist's mannequin in the desired pose, or any other representation from which target pose data may be extracted.

The target individual (depicted in the target pose image) may be the same as the subject individual. For example, in some embodiments, a user of the image processing system 200 may be a person wishing to select an image of herself from a set of professional portraits (the candidate images). The user may already have an image of herself that she likes (e.g., due to the orientation of the users face, the shape of the user's smile, and other pose-related characteristics). The user may supply this image to the image processing system 200 as the target pose image. The target pose image may then be processed by the pose identification logic 208 to generate target pose data representative of the pose of the user, and, as discussed below, the processing logic 202 may then compare the target pose data to the candidate pose data (representative of the user's pose in the candidate images) to generate similarity values and select the desired image (e.g., the image in which the user is posed most similarly to the pose depicted in the target pose image).

The pose identification logic 208 may extract the target pose data from the input in any of a number of ways. For example, in some embodiments, the input may be an audio input that may receive speech input from a user. This speech input may be descriptive of a target pose (e.g., "head tilted to the left," "big smile," "winking," or "facing the camera," for example). The pose identification logic 208 may be configured to perform speech recognition on this audio data, and may generate the target pose data based on the recognized speech. In particular, the pose identification logic 208 may detect one or more key phrases in audio data (and/or in a processed representation of audio data, e.g., a text representation of spoken words), which may be stored in a dictionary of key phrases (e.g., in the storage device 226) that correspond to various pose attributes (e.g., posture, head angle, size of smile, whether eyes are open or closed, hair arrangement, eyebrow orientation, hand position, etc.). In some embodiments, the pose identification logic 208 may be configured to extract the attribute from the audio data and use that attribute (and any information about that attribute) as target pose data.

The pose identification logic 208 may assign priorities or weights to various components of target pose data. For example, in some embodiments, a user of the computing system 100 may be attempting to input a target pose image by posing in front of the image capture device 104. In order to get the desired head tilt, for example, the user may be repeatedly adjusting her head, while keeping her facial expression and the rest of her body fairly constant. In some embodiments, the pose identification logic 208 may identify which of a number of pose attributes (e.g., head tilt) is varying the most over a predetermined window (e.g., the last three seconds of target pose images) and may prioritize that attribute when generating target pose data. In some embodiments, the pose analysis logic 212 may perform this prioritization and/or analysis instead of or in addition to the pose identification logic 208.

The processing logic 202 may include pose analysis logic 212. The pose analysis logic 212 may be coupled with the pose identification logic 208 and may be configured to compare the pose data, generated by the pose identification logic 208 for each of the candidate images, to target pose data. As discussed above, the target pose data may be generated by the pose identification logic 208 based on, for example, a target pose image or other target pose information (e.g., target pose attributes and values communicated in recognized speech) provided to the processing logic 202.

In particular, the pose analysis logic 212 may be configured to generate a similarity value for each of the candidate images. A similarity value may be a single- or multi-dimensional quantity representing the similarity of the pose data associated with a particular candidate image to the target pose data. The pose analysis logic 212 may generate a similarity value for each candidate image. As discussed in further detail below, the similarity values may be used for selecting an image from the candidate images. In some embodiments, the pose analysis logic 212 may output multiple similarity values for each candidate image, with the different similarity values representing different types of similarities (e.g., similarity of smile, similarity of head tilt, similarity of arm position).

In some embodiments, a similarity value may be calculated by computing an inner product between vector representations of the pose data and the target pose data. A vector representation may be any representation in a multi-dimensional space, such as any of the representations discussed below with reference to FIG. 3, and an inner product may be defined in any desired manner. In some embodiments, a similarity value may be calculated by determining an edit distance between the pose data and the target pose data (i.e., determining a minimum number and/or magnitude of edits to the pose data to transform the pose data into the target pose data).

In some embodiments in which the pose data includes a prioritized set of nominal and/or ordinal attribute (e.g., as discussed above with reference to the pose identification logic 208), the pose analysis logic 212 may store a predetermined set of attributes and a priority or weighting of each attribute in the set (e.g., "smile" prioritized first or given largest weighting, "head turn" prioritized second or given next largest weighting, etc.). The pose analysis logic 212 may then compare pose data from a candidate image and target pose data from a target image to determine a similarity value, based on the attributes and the priorities in accordance with predefined criteria. The similarity value may reflect the number of "matches" of various attribute, as well as the priority or weight of these categories. For example, if the pose analysis logic 212 determines that, when comparing pose data from a candidate image and pose data from a target image, a match is found for "smile" and "head turn" (as discussed above) the pose analysis logic 212 may output a high similarity value; by contrast, if a match is found only for "head turn," the pose analysis logic 212 may output a lower similarity value. When an image includes multiple subjects, an attribute-based analysis (as described above) may be performed for each subject in each image, and the results across subjects combined (e.g., using a weighted combination).

The processing logic 202 may include selection logic 214. In some embodiments, the selection logic 214 may be coupled with the pose analysis logic 212 and may be configured to compare the similarity values generated by the pose analysis logic 212 for each of the candidate images to selection criteria. The selection criteria may be stored in the storage device 226, or in another location accessible by the selection logic 214. The selection logic 214 may be further configured to select an image, from the candidate images, having a similarity value that meets the selection criteria. In some embodiments, the selection criteria may provide that the image with the highest similarity value is to be selected. In some embodiments, the selection criteria may provide that a certain number of candidate images (e.g., three) having the highest similarity scores should be selected, and displayed so that the user can complete the selection by choosing one. The user may choose through touch selection, voice command, etc. In some embodiments, the selection criteria may be based on the similarity values as well as additional criteria, such as brightness, contrast, focus, saturation, or other criteria. The selection logic 214 may adjust the selection criteria in response to previous user behavior. For example, if the viewer had not previously shown interest in images in which the subject was smiling, the selection logic 214 may deprioritize "smiling" in a list of attributes to evaluate. In some embodiments, the computing system 100 may automatically present additional candidate images to the user in response to an indication by the user that previously presented candidate images were not satisfactory.

The processing logic 202 may include image editing logic 220. The image editing logic 220 may be coupled with the selection logic 214 and configured to replace a portion of a base image with a corresponding portion of the image selected by the selection logic 214 to generate an edited base image. The base image may be one of the candidate images, or may be a different image. The base image may be supplied by the user (e.g., via the input device 210) or may be automatically selected by the image processing system 200 from a collection of images (e.g., the candidate images) based upon some set of criteria (e.g., focus, hue, saturation, lightness, uniformity of individual poses in the image, etc.). The edited base image may be stored in the storage device 226, e-mailed or otherwise electronically transferred (e.g., to a social networking service or to any other remote or local device), and/or displayed.

In some embodiments, the portion of the base image and the corresponding portion of the selected image each depict the subject individual. For example, when the base image is a group portrait and the selected image depicts a particular participant in the group portrait, the image editing logic 220 may replace the portion of the group portrait depicting the particular participant with a corresponding portion of an image of the particular participant selected by the selection logic 214 from the candidate images. Such an embodiment may be particularly advantageous when many candidate images of the group portrait are available; the image processing system 200 may select the one of the candidate images in which the particular person is posed in a manner most similar to a desired target pose, and replace the portion of a base image (e.g., the otherwise "best" image of the group) depicting the particular person with the corresponding portion of the selected image.

The processing logic 202 may include display logic 216. In some embodiments, the display logic 216 may be coupled with the selection logic 214 and with the display device 218 (or any other output device) to provide, for display, a portion of the image selected by the selection logic 214. The displayed portion may include the entire selected image, or a smaller portion of the selected image in which only the subject individual is depicted, for example. In some embodiments, the display logic 216 may be coupled with the image editing logic 220 and with the display device 218 (or any other output device) to provide, for display, an edited base image generated as described above with reference to the image editing logic 220.

In some embodiments, a user of the image processing system 200 may be permitted to analyze and edit images of any subject individual using the techniques described above. In some embodiments, the user may be restricted to analyzing and editing only images that depict the user herself or other designated individuals (e.g., social network "friends" of the user who have granted the user permission to edit images in which the friends are depicted). Restrictions on the relationship between the user and the subject individuals may be particularly useful in social networking or image sharing environments, in which images depicting multiple people may be uploaded and shared within the environment. These restrictions may allow a user to only edit images in the environment in which she is depicted, and then to only edit the portions depicting the user herself or designated others.

Thus, in some embodiments, the processing logic 202 may include user authentication logic 222. The user authentication logic 222 may be coupled with the input device 210 and may be configured to authenticate a user of the image processing system 200. The user authentication logic 222 may also be configured to output an indicator that the person could not be authenticated (e.g., when the user authentication logic 222 is unable to identify the person within a desired confidence level).

The user authentication logic 222 may authenticate the user in any of a number of ways. For example, the user authentication logic 222 may include voice analyzer logic, which may perform one or more audio processing techniques on audio data received from an audio capture device included in the input device 210 to determine one or more voice-related features of the audio data, determine a voice signature for each voice detected in the audio data (e.g., an audio frequency profile or other data representative of the detected voice), and identify the user by comparing the determined voice signature to a previously authenticated voice signature (stored, e.g., in the storage device 226). For example, the user authentication logic 222 may include a trained classifier configured to identify a voice signature and output an identifier (e.g., a name) of a speaker detected in audio data.

In another example, the user authentication logic 222 may receive an image of the user (e.g., captured by the image capture device 104 or another image capture device included in the input device 210), determine a facial signature for the face detected in the image (which may include the relative positions of various facial features that may identify a person, such as the corners of eyes, tip of nose, and shape of mouth), and output an identifier of the person based on the facial signature (e.g., using a trained classifier).

The user authentication logic 222 may be coupled to recognition logic 224. Once the user is authenticated by the user authentication logic 222 (as discussed above), the recognition logic 224 may be configured to determine whether the subject individual is a same individual as the user. In some embodiments, the recognition logic 224 may do so based on a stored image of the user. In particular, if the stored image is known to depict the user, the recognition logic 224 may be configured to compare the subject individual in the candidate images against the stored image using face recognition techniques (known in the art) and determine whether the subject individual is the user. An image may be validated as being a true representation of the user because of its provenance (e.g., the image is a passport or driver's license photograph), by testimonials from trusted individuals (e.g., twenty of the user's friends agree that the image represents the user) or in any other manner. The stored image of the user may be stored in the storage device 226. In some embodiments, the image editing logic 220 may be coupled to the recognition logic 224, and may be configured to generate the edited base image (as discussed above) only when the recognition logic 224 determines that the subject individual is the same individual as the user.

The components of the image processing system 200 (FIG. 2) may be distributed in any suitable combination between one or more of the components of the computing system 100 (FIG. 1). For example, the display logic 216 and/or the image input logic 206 may be included in the personal computing device 102, and the pose analysis logic 212, the selection logic 214, the pose identification logic 208, and/or the image editing logic 220 may be distributed between the personal computing device 102 and the remote computing device 106. In some embodiments, the image capture device 104 may be included in the personal computing device 102 and the pose analysis logic 212 may be included in the personal computing device 102, the remote computing device 106, or distributed between the two.

Figure 3:
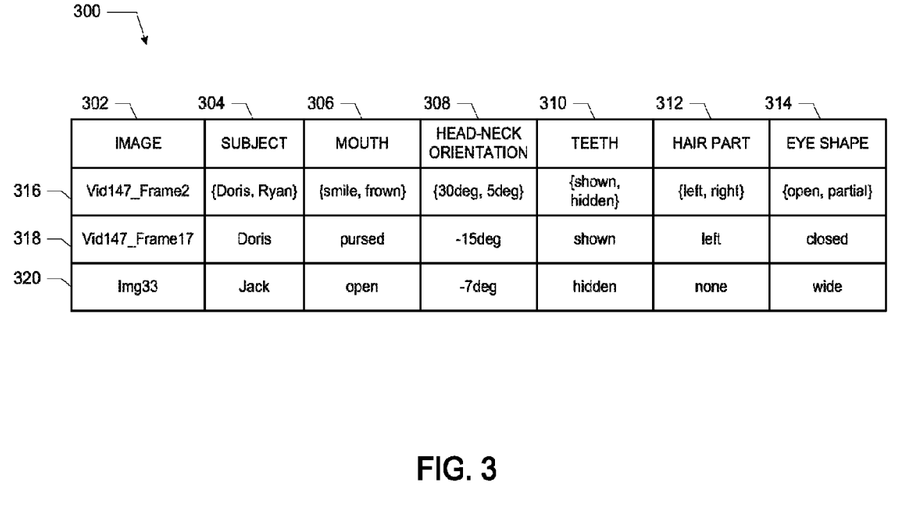
FIG. 3 depicts an illustrative memory structure for storing pose data to enable processing of a plurality of images of a subject individual, in accordance with various embodiments.

FIG. 3 depicts an illustrative memory structure 300 for storing pose data (generated, e.g., by the pose identification logic 208) to enable processing of a plurality of images of a subject individual, in accordance with various embodiments. Pose data arranged in the memory structure 300 (or any other memory structure) may be stored in the storage device 226. As discussed above, the storage device 226 may include a database or other data storage structure which may include memory structures (such as the memory structure 300) for storing pose data and other data. The memory structure 300 is an illustrative example of a possible memory structure, and any memory structure containing information to enable the processing operations disclosed herein may be used.

The memory structure 300 may be principally indexed by image, and may include a number of data fields. The memory structure 300 may include an image identifier field 302, which may store an identifier of the image (e.g., a filename). The memory structure 300 may include a subject individual field 304, which may store an identifier of one or more subject individuals identified in an image. Each time an image is used as a candidate image with respect to a subject individual, the pose identification logic 208 or any other suitable component of the image processing system 200 may update the subject individual field with a subject individual identified in the image. When pose data about multiple subjects in an image is generated, an entry in the memory structure 300 for the image may contain corresponding multi-dimensional fields. For example, the image Vid145_Frame2 is shown in FIG. 3 as including two subject individuals (Doris and Ryan), and the fields 306-314 include ordered pairs of values corresponding to the two subject individuals, respectively.

Continuing with FIG. 3, the memory structure 300 may include a mouth shape field 306, which may store an identifier of the shape of the subject individual's mouth in the corresponding image. The memory structure 300 may include a head-neck orientation field 308, which may store an identifier of the angle between the subject individual's head and neck in the corresponding image. The memory structure 300 may include a teeth exposure field 310, which may store an indicator of whether and/or to what degree a subject individual's teeth are exposed in the corresponding image. The memory structure 300 may include a hair part field 312, which may store an identifier of the location of a part in the subject individual's hair in the corresponding image. The memory structure 300 may include an eye shape field 314, which may store an identifier of the shape of the subject individual's eyes in the corresponding image.

Three example entries 316, 318 and 320 are depicted for illustrative purposes. The data fields illustrated in FIG. 3 are illustrative, and any one or more data field may be omitted and/or additional data fields may be included. The example entries 316-320 in the memory structure 300 include discrete values (e.g., "shown" and "hidden" for the teeth exposure field 310) for the various fields. In some embodiments, pose data of a subject individual may be represented as a collection of markers of the relative positions of identifiable landmarks on the subject individual's body. Examples of landmarks may include the ends of the eyebrows, the middle of the eyebrows, the corners of the eyes, the top and bottom of the eyes, the tip of the nose, the bridge of the node, the nostrils, the corners of the mouth, the upper and lower lips, the teeth, the ear lobes, the chin, the edges of the neck, the top of the forehead, the hands, the shoulders, the elbows, the knees, the hips, the feet, and any other landmark that may be identified in an image (e.g., by the pose identification logic 208) of an individual using any suitable image processing technique. For each subject individual in an image, the memory device 226 will include a memory structure that stores the relative positions of any one or more such landmarks.

Figure 4:
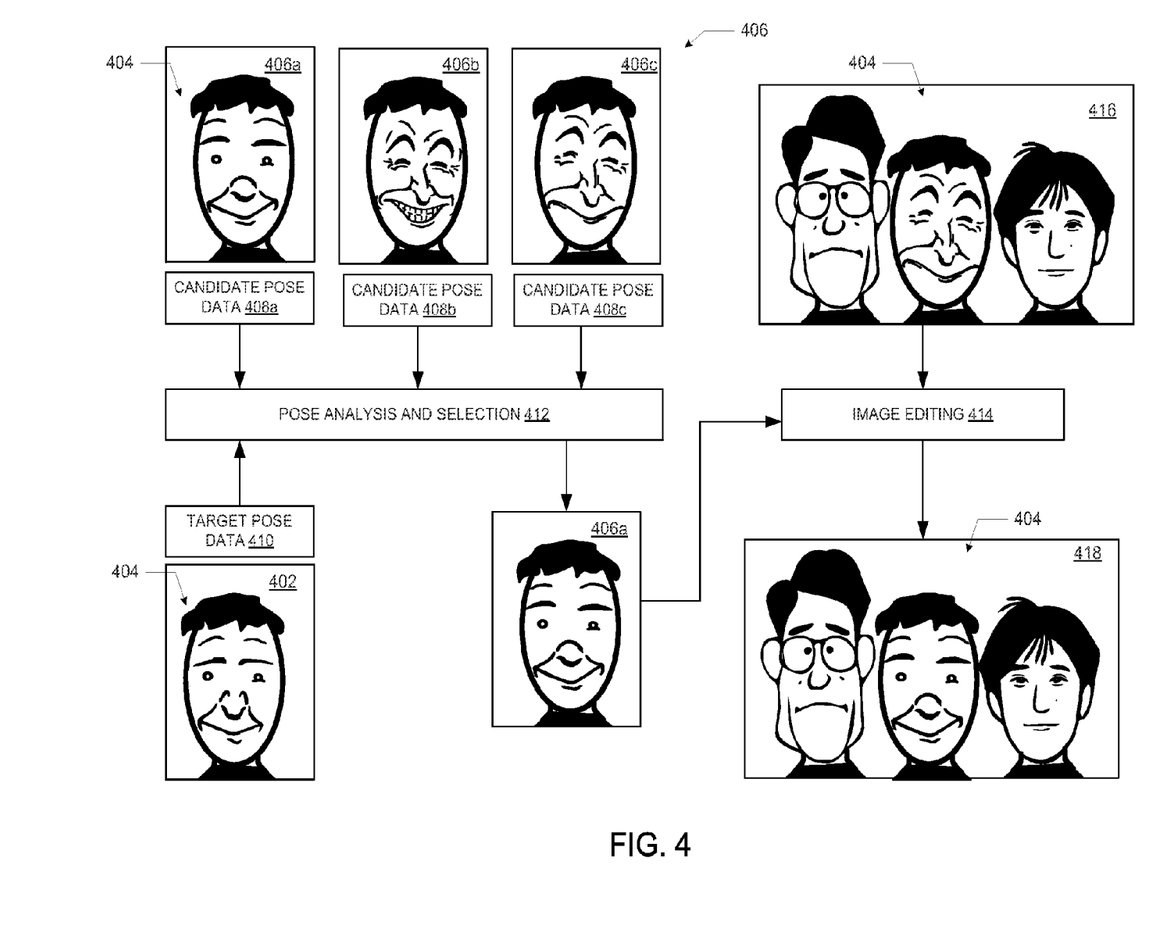
FIGS. 4-6 illustrate example applications of techniques for processing images of a subject individual, in accordance with various embodiments.
Figure 5:
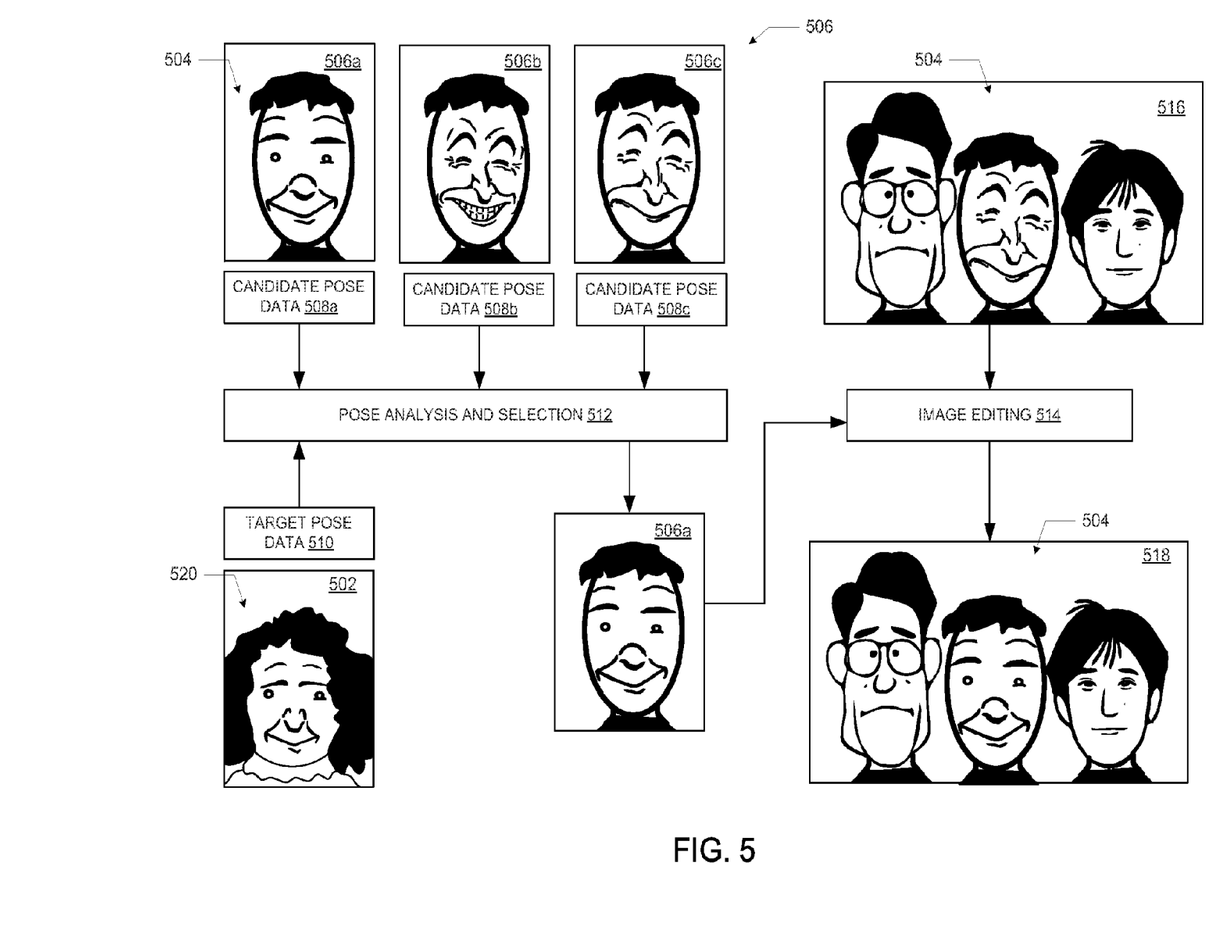
Figure 6:
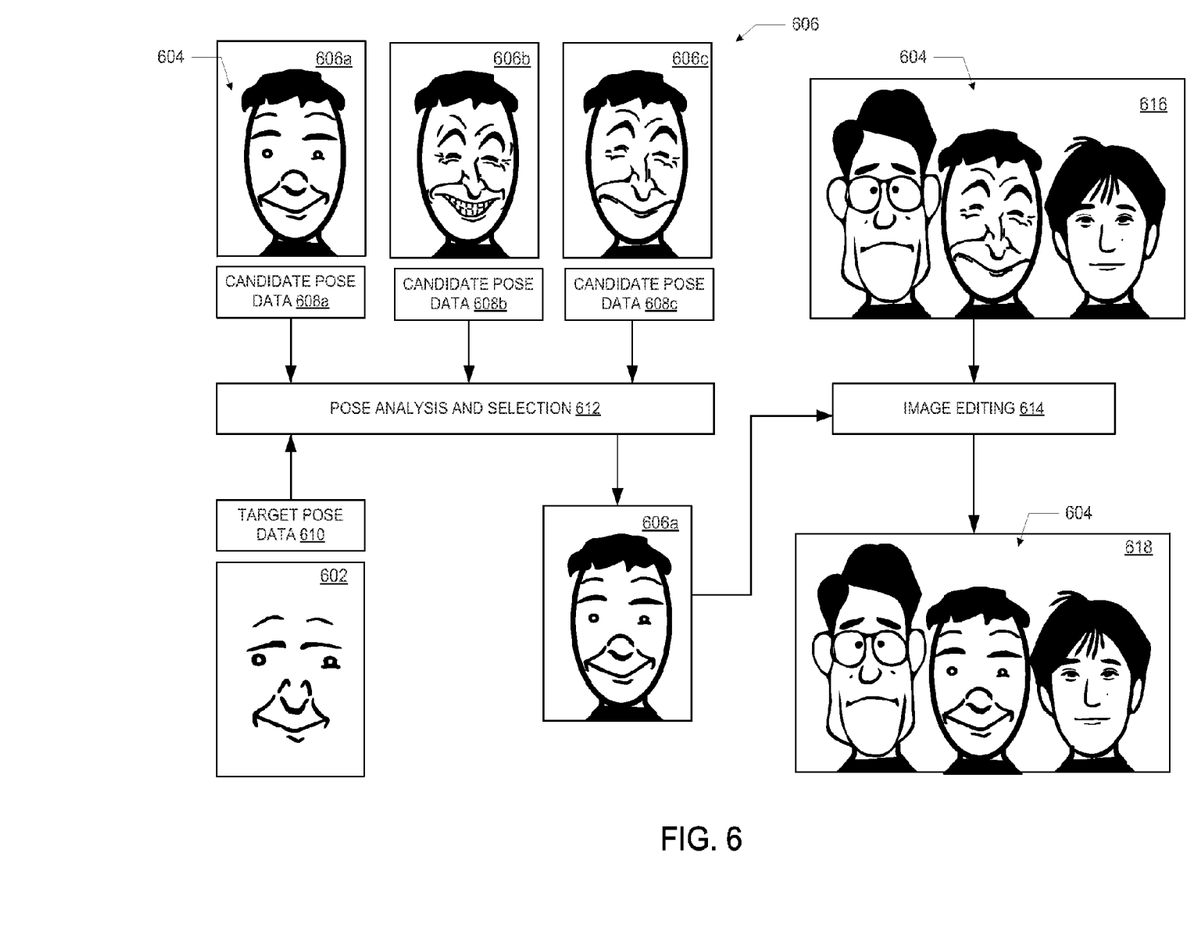

FIGS. 4-6 illustrate example applications of techniques for processing images of a subject individual, in accordance with various embodiments. Each of FIGS. 4-6 illustrates the use of target pose data and a plurality of candidate images to select an image from the candidate images, and the use of the selected image to replace a portion of a base image to form an edited base image.

FIG. 4 depicts a plurality of candidate images 406. Each candidate image 406a, 406b and 406c depicts a same subject individual 404. Although each of the candidate images 406 in FIG. 4 depicts only a single individual (the subject individual 404), a candidate image (as used herein) may depict one or more individuals in addition to the subject individual. A candidate image may also include other subject matter, such as scenery and objects. In the candidate images 406, the subject individual 404 may be depicted in different poses (e.g., different facial expressions, head angles, arm position, etc.). The candidate images 406 may be received by the image input logic 206 of the image processing system 200 (FIG. 2). The candidate images 406a, 406b and 406c may be processed by the pose identification logic 208 to generate pose data 408a, 408b and 408c, respectively. The pose data 408a, 408b and 408c may be representative of the pose of the subject individual 404 in the candidate images 406a, 406b and 406c, respectively. The candidate pose data 408a, 408b and 408c may take any suitable form (e.g., in accordance with any of the embodiments of target pose data disclosed herein).

FIG. 4 also depicts a target pose image 402. The target pose image 402 depicts a target individual. In the example illustrated in FIG. 4, the target individual is the subject individual 404. The target pose image 402 may be received by the image input logic 206 of the image processing system 200 (FIG. 2). The target pose image 402 may be processed by the pose identification logic 208 to generate target pose data 410, representative of the pose of the target individual (here, the subject individual 404). The target pose data 410 may take any suitable form (e.g., in accordance with any of the embodiments of target pose data disclosed herein).

The candidate pose data 408a, 408b and 408c, and the target pose data 410 may be provided to the pose analysis logic 212 and the selection logic 214 of the processing logic 202 to perform pose analysis and selection operations (indicated by 412 in FIG. 4). These operations may include comparing the target pose data 410 to the candidate pose data 408a, 408b and 408c to generate similarity values and selecting an image from the candidate images 406 in which the subject individual 404 is posed most similarly to the pose depicted in the target pose image 402. As shown in FIG. 4, the selected image may be the image 406a.

A portion of the selected candidate image 406a may then be used to replace a corresponding portion of a base image 416. In particular, the image editing logic 220 may crop or otherwise process the selected candidate image 406a, and replace the portion of the base image 416 depicting the subject individual 404 with the representation of the subject individual 404 in the selected candidate image 406a (indicated by 414 in FIG. 4) to form an edited base image 418. The edited base image 418 may be stored in the storage device 226, e-mailed or otherwise electronically transferred, and/or displayed.

FIG. 5 depicts a plurality of candidate images 506. Each candidate image 506a, 506b and 506c depicts a same subject individual 504. The candidate images 506 may be received by the image input logic 206, and may be processed by the pose identification logic 208 to generate pose data 508a, 508b and 508c, respectively. FIG. 5 also depicts a target pose image 502. The target pose image 502 depicts a target individual 520.

Unlike the example of FIG. 4, the target individual 520 is a different individual than the subject individual 504. For example, the target individual 520 may be a user of the image processing system 200 (e.g., a photographer or editor), and the target pose image 502 may have been captured by the image capture device 104, while the user was in the process of reviewing and/or editing images, for the purpose of being used as the target pose image 502. However, the pose identification logic 208 may still generate target pose data 510 based on the pose of the target individual 520 in the target pose image 502, and the candidate pose data 508a, 508b and 508c, and the target pose data 510 may be provided to the pose analysis logic 212 and the selection logic 214 of the processing logic 202 to perform pose analysis and selection operations (indicated by 512 in FIG. 5). As discussed above, these operations may include comparing the target pose data 510 to the candidate pose data 508a, 508b and 508c to generate similarity values and selecting an image from the candidate images 506 in which the subject individual 504 is posed most similarly to the pose depicted in the target pose image 502. As shown in FIG. 5, the selected image may be the candidate image 506a. As discussed above with reference to FIG. 4, a portion of the selected candidate image 506a may then be used (e.g., by the image editing logic 220) to replace a corresponding portion of a base image 516 generate an edited base image 518 (indicated by 514 in FIG. 5). The edited base image 518 may be stored in the storage device 226, e-mailed or otherwise electronically transferred, and/or displayed.

FIG. 6 depicts a plurality of candidate images 606. Each candidate image 606a, 606b and 606c depicts a same subject individual 604. The candidate images 606 may be received by the image input logic 206, and may be processed by the pose identification logic 208 to generate pose data 608a, 608b and 608c, respectively. Unlike the examples of FIGS. 4 and 5, FIG. 6 does not depict the use of a target pose image to generate target pose data, but rather the use of a sketch 602 of a desired pose (drawn by a user of the image processing system 200, for example, using mouse or a tablet device and stylus). In FIG. 6, the target pose is a target facial expression. The pose identification logic 208 may still generate target pose data 610 based on the pose in the sketch 602, and the candidate pose data 608a, 608b and 608c, and the target pose data 610 may be provided to the pose analysis logic 212 and the selection logic 214 of the processing logic 202 to perform pose analysis and selection operations (indicated by 612 in FIG. 6), as discussed above. As shown in FIG. 6, the selected image may be the candidate image 606a. As discussed above with reference to FIGS. 4 and 5, a portion of the selected candidate image 606a may then be used (e.g., by the image editing logic 220) to replace a corresponding portion of a base image 616 generate an edited base image 618 (indicated by 614 in FIG. 6). The edited base image 618 may be stored in the storage device 226, e-mailed or otherwise electronically transferred, and/or displayed.

Figure 7:
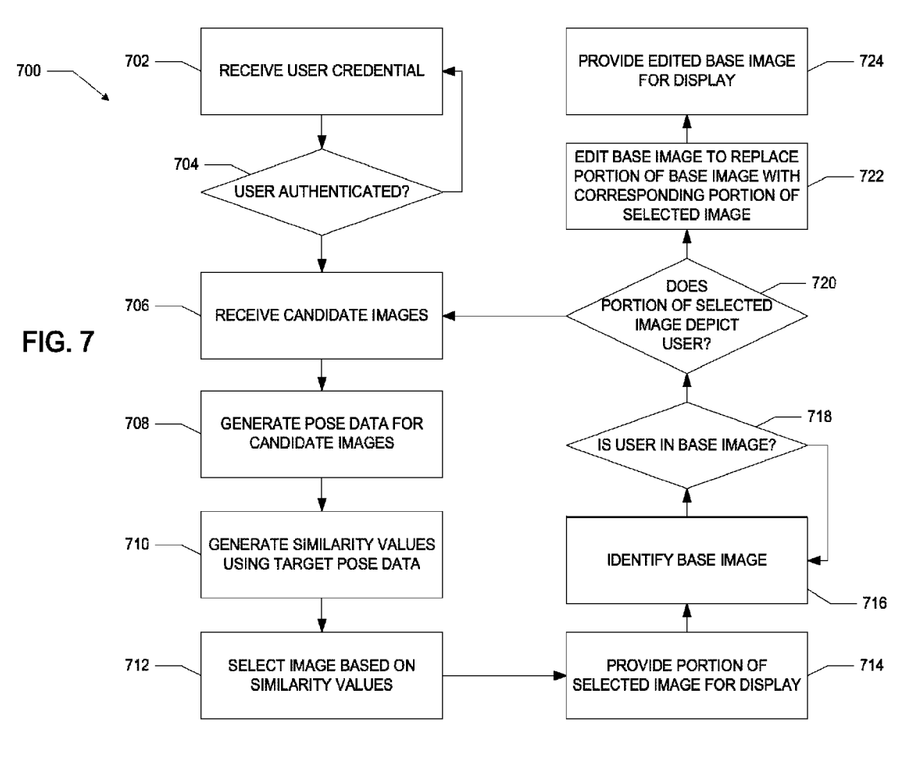
FIG. 7 is a flow diagram of an illustrative process for processing images of a subject individual, in accordance with various embodiments.

FIG. 7 is a flow diagram of an illustrative process 700 for processing images of a subject individual, in accordance with various embodiments. It may be recognized that, while the operations of the process 700 are arranged in a particular order and illustrated once each, in various embodiments, one or more of the operations may be repeated, omitted or performed out of order. For illustrative purposes, operations of the process 700 may be described as performed by the image processing system 200 (which may be embodied in the computing system 100), but the operations of the process 700, including individual operations of the process 700, may be performed by any suitably configured computing device or collection of computing devices.

Referring now to FIG. 7, the process 700 may begin at the operation 702, in which the image processing system 200 (e.g., via the input device 210) may receive a user credential. The user credential may be any data usable to authenticate the user, such as a username and password.

At the decision block 704, the image processing system 200 (e.g., the user authentication logic 222) may determine whether the user credential received at the operation 702 authenticates a user. If a user is not validly authenticated, the process 700 may return to the operation 702 and await a valid user credential. If a user is validly authenticated at the decision block 704, the process 700 may proceed to the operation 706. In some embodiments, authentication may not be performed, and thus the operation 702 and the decision block 704 may be omitted.

At the operation 706, the image processing system 200 (e.g., the image input logic 206) may receive a plurality of candidate images of the subject individual. At the operation 708, the image processing system 200 (e.g., the pose identification logic 208) may generate pose data for each of the candidate images received at the operation 706. The pose data associated with a candidate image may be representative of a pose of the subject individual in that image.

At the operation 710, the image processing system 200 (e.g., the pose analysis logic 212) may compare the pose data to target pose data to generate a similarity value for each of the candidate images. The similarity values may be used for selecting an image from the candidate images, as discussed herein. In some embodiments, the target pose data may be generated by the pose identification logic 208 upon receiving a target pose image of a target individual. In such embodiments, the target pose data may be representative of the pose of the target individual in the target image. In some embodiments, the target individual may be different from the subject individual. The target pose image may be captured by the image capture device 104. In some embodiments, the target pose data may be based on a target pose of an input. The input may be one of a touch input, a voice input, or a gesture input, for example.

At the operation 712, the image processing system 200 (e.g., the selection logic 214) may select an image from the candidate images based on the similarity values generated at the operation 710. In some embodiments, the operation 712 may include comparing the similarity values to selection criteria, and selecting, an image, from the candidate images, having a similarity value that meets the selection criteria.

At the operation 714, the image processing system 200 (e.g., the display logic 216) may provide, for display, a portion of the image selected at the operation 712. The operation 714 may include e-mailing the image or uploading the image to an Internet-based service, for example.

At the operation 716, the image processing system 200 (e.g., the image editing logic 220) may identify a base image to be edited using a portion of the image selected at the operation 712. At the decision block 718, the image processing system 200 (e.g., the recognition logic 224) may determine whether the user of the image processing system 200 (e.g., as authenticated at the operation 704) is depicted in the base image (using, e.g., any computational recognition technique). If not, the image processing system 200 may return to the operation 716 and prompt the user to select another base image for editing. If the user is depicted in the base image, the image processing system 200 may proceed to the decision block 720 and determine whether the image selected at the operation 712 depicts the user. If not, the process may return to the operation 706 and the image processing system 200 may prompt the user to select one or more candidate images that depict the user herself. The decision blocks 718 and/or 720 may only be included in the process 700 when the user of the image processing system 200 is restricted as to which individuals she is authorized to replace in a base image. In particular, the decision blocks 718 and 720 may be included in the process 700 when the user is only authorized to edit her own depiction in base images. Otherwise, the decision blocks 718 and/or 720 may not be included, as appropriate.

At the operation 722, the image processing system 200 (e.g., the image editing logic 220) may edit the base image (identified at the operation 716) to replace a portion of a base image with a corresponding portion of the selected image to generate an edited base image. The portion of the base image and the corresponding portion of the selected image may each depict the subject individual. As discussed above, in some embodiments, the edited base image may be generated only when the subject individual is determined to be the same individual as the user.

At the operation 724, the image processing system 200 (e.g., the display logic 216) may provide, for display, a portion of the edited base image generated at the operation 722. The operation 724 may include e-mailing the edited base image or uploading the edited base image to an internet-based service, for example.

Computer readable media (including non-transitory computer readable media), methods, systems and devices for performing the above-described techniques are illustrative examples of embodiments disclosed herein. In some embodiments, such computer readable media may be included in a storage device of any of the computing devices in the computing system 100 or the image processing system 200, as illustrated in FIGS. 1 and 2 (e.g., the storage device 226). For example, computational logic included in a storage device of any computing device may include assembler instructions supported by a processing device included in the computing device, or may include instructions in a high-level language, such as C, that can be compiled by the processing device. In some embodiments, a permanent copy of the computer readable instructions may be placed into permanent storage in the storage device in the factory or in the field (through, for example, a machine-accessible distribution medium (not shown), such as a compact disc). In some embodiments, a permanent copy of the computer readable instructions may be placed into permanent storage in the storage device through a suitable communication pathway (e.g., from a distribution server).

The following paragraphs provide a number of examples of embodiments of the present disclosure. Example 1 is a system for processing images of a subject individual, including: image input logic to receive a plurality of candidate images of the subject individual; pose identification logic to generate pose data for each of the candidate images, the pose data associated with a candidate image representative of a pose of the subject individual in that image; and pose analysis logic to compare the pose data, generated by the pose identification logic for each of the candidate images, to target pose data to generate a similarity value for each of the candidate images for selecting an image from the candidate images.

Example 2 may include the subject matter of Example 1, and may further include selection logic to compare the similarity values generated by the pose analysis logic to selection criteria, and select an image, from the candidate images, having a similarity value that meets the selection criteria.

Example 3 may include the subject matter of Example 2, and may further include display logic to provide, for display, a portion of the selected image.

Example 4 may include the subject matter of any of Examples 1-3, and may further specify that the image input logic is to further receive a target pose image of a target individual, and the pose identification logic is to further generate the target pose data for the target pose image, the target pose data representative of the pose of the target individual in the target image.

Example 5 may include the subject matter of Example 4, wherein the target individual is different from the subject individual.

Example 6 may include the subject matter of Example 4, and may further include an image capture device, coupled to the image input logic, to capture the target pose image.

Example 7 may include the subject matter of any of Examples 1-6, and may further include an input device, coupled to the pose identification logic, to receive an input, wherein the input is one of a touch input, a voice input, or a gesture input, and the input is representative of a target pose, and wherein the pose identification logic is to further generate the target pose data based on the target pose represented in the input.

Example 8 may include the subject matter of any of Examples 1-7, and may further include image editing logic to replace a portion of a base image with a corresponding portion of the selected image to generate an edited base image.

Example 9 may include the subject matter of Example 8, and may further specify that the portion of the base image and the corresponding portion of the selected image each depict the subject individual.

Example 10 may include the subject matter of Example 8, and may further include display logic to provide, for display, the edited base image.

Example 11 may include the subject matter of Example 8, and may further include user authentication logic to authenticate a user of the system and recognition logic to determine whether the subject individual is a same individual as the user based on a stored image of the user, wherein the image editing logic is to generate the edited base image only when the recognition logic determines that the subject individual is the same individual as the user.

Example 12 is a method for processing images of a subject individual, including: receiving, by a computing system, a plurality of candidate images of the subject individual; generating, by the computing system, pose data for each of the candidate images, the pose data associated with a candidate image representative of a pose of the subject individual in that image; and comparing, by the computing system, the pose data to target pose data to generate a similarity value for each of the candidate images for selecting an image from the candidate images.

Example 13 may include the subject matter of Example 12, and may further include: comparing, by the computing system, the similarity values to selection criteria; and selecting, by the computing system, an image, from the candidate images, having a similarity value that meets the selection criteria.

Example 14 may include the subject matter of Example 13, and may further include providing, by the computing system for display, a portion of the selected image.

Example 15 may include the subject matter of any of Examples 12-14, and may further include: receiving, by the computing system, a target pose image of a target individual; and generating, by the computing system, the target pose data for the target pose image, the target pose data representative of the pose of the target individual in the target image.

Example 16 may include the subject matter of Example 15, and may further specify that the target individual is different from the subject individual.

Example 17 may include the subject matter of Example 15, and may further include capturing, by an image capture device, the target pose image.

Example 18 may include the subject matter of any of Examples 12-17, and may further include receiving, by the computing system, an input, wherein the input is one of a touch input, a voice input, or a gesture input, wherein the input is representative of a target pose and the target pose data is based on the target pose of the input.

Example 19 may include the subject matter of any of Examples 12-18, and may further include replacing, by the computing system, a portion of a base image with a corresponding portion of the selected image to generate an edited base image.

Example 20 may include the subject matter of Example 19, and may further specify that the portion of the base image and the corresponding portion of the selected image each depict the subject individual.

Example 21 may include the subject matter of Example 19, and may further include providing, by the computing system for display, the edited base image.

Example 22 may include the subject matter of Example 19, and may further include: authenticating, by the computing system, a user of the computing system; and determining, by the computing system, whether the subject individual is a same individual as the user based on a stored image of the user. The edited base image may be generated only when the subject individual is determined to be the same individual as the user.

Example 23 is one or more computer readable media having instructions thereon that, when executed by one or more processing devices of a computing system, cause the computing system to perform the method of any of Examples 12-22.

Example 24 is a system for processing images of a subject individual, including: means for receiving a plurality of candidate images of the subject individual; means for generating pose data for each of the candidate images, the pose data associated with a candidate image representative of a pose of the subject individual in that image; and means for comparing the pose data, generated by the pose identification logic for each of the candidate images, to target pose data to generate a similarity value for each of the candidate images for selecting an image from the candidate images.

Example 25 may include the subject matter of Example 24, and may further include: means for comparing the similarity values generated by the pose analysis logic to selection criteria, and means for selecting an image, from the candidate images, having a similarity value that meets the selection criteria.

The invention claimed is:

1. A system for processing images, comprising:
one or more computing processors;
physical memory coupled with the one or more processors;
an image input logic module, to be loaded into the physical memory and executed by the one or more processors, to receive a plurality of candidate images of frames of a video stream, with each candidate image having a plurality of same subject individuals;
a pose identification logic module, to be loaded into the physical memory and executed by the one or more processors, to generate pose data for each of the candidate images, the pose data associated with a candidate image representative of a pose of each of the plurality of subject individuals in that image;
a display logic module, to be loaded into the physical memory and executed by the one or more processors, to display one of the candidate images;

wherein the image input logic module is to further receive a respective desired target pose image for each of the plurality of subject individuals based on a sketch of a desired target pose or a speech descriptive of a target pose, and the pose identification logic module is to generate respective desired pose data for the respective desired target pose images;
wherein the system further comprises:
a pose analysis logic module, to be loaded into the physical memory and executed by the one or more processors, to compare the pose data of each of the plurality of subject individuals, generated by the pose identification logic module for each of the candidate images, to the respective desired target pose data for each of the plurality of subject individuals to generate a similarity value for each of the candidate images;
an image editing logic module, to be loaded into the physical memory and executed by the one or more processors, wherein the image editing logic module is to create a new image of the plurality of subject individuals based at least in part on one of the similarity values; and
wherein the display logic module is to display the created new image.

2. The system of claim 1, wherein the display logic module is to send a portion of the created new image to a mobile device.

3. The system of claim 1, further comprising:
a hardware input device, electrically coupled to the pose identification logic module, to receive an input, wherein the input is one of a touch input, a voice input, or a gesture input, and the input is representative of a target pose wherein the pose identification logic module is to further generate the target pose data based at least on the input.

4. The system of claim 1, wherein the respective desired target pose images are selected by at least one of the plurality of subject individuals.

5. The system of claim 1, wherein the respective desired target pose images are selected based on identified respective images of the respective plurality of subject individuals.

6. The system of claim 5, wherein the identified respective images of the respective plurality of subject individuals are base upon respective descriptive criteria of the respective plurality of individuals.

7. The system of claim 6, wherein the descriptive criteria include a position of a head or a description of a facial feature.

8. One or more non-transitory computer readable media having instructions thereon that, when executed by one or more processing devices of a computing system, cause the computing system to:
receive a plurality of candidate images of frames of a video stream, with each candidate image having a plurality of same subject individuals;
generate pose data for each of the candidate images, the pose data associated with a candidate image representative of a pose of each of the plurality of subject individuals in that image;
display one of the candidate images;
receive a respective desired target pose image for each of the plurality of subject individuals based on a sketch of a desired target pose or a speech descriptive of a target pose;
generate respective desired pose data for the respective desired target pose images;

compare the respective pose data of each of the plurality of subject individuals for each of the candidate images to the respective desired target pose data for each of the plurality of subject individuals to generate a similarity value for each of the respective candidate images;

create a new image of the plurality of subject individuals based at least in part on one of the similarity values; and display the created new image.

9. The one or more non-transitory computer readable media of claim 8, further having instructions thereon that, when executed by one or more processing devices of a computing system, cause the computing system to:

provide, for display, a portion of the created new image to a mobile device.

10. The one or more non-transitory computer readable media of claim 8, further having instructions thereon that, when executed by one or more processing devices of a computing system, cause the computing system to:

receive an input, wherein the input is one of a touch input, a voice input, or a gesture input, wherein the target pose data is based at least on the input.

11. A method for processing images, comprising:

receiving a plurality of candidate images of frames of a video stream, with each candidate image having a plurality of same subject individuals;

generating pose data for each of the candidate images, the pose data associated with a candidate image representative of a respective pose of each of the plurality of subject individuals in that image;

displaying one of the candidate images;

receiving a respective desired target pose image for each of the plurality of subject individuals based on a sketch of a desired target pose or a speech descriptive of a target pose;

generating respective desired pose data for the respective desired target pose images;

comparing the respective pose data of each of the plurality of subject individuals for each of the candidate images to the respective desired target pose data for each of the plurality of subject individuals and generating a similarity value for each of the candidate images;

creating a new image of the plurality of subject individuals based at least in part on one of the similarity values; and displaying the created new image.

12. The method of claim 11, wherein displaying the created new image further includes one of sending the created new image to a mobile device.

* * * * *